(12) United States Patent
Sahlin et al.

(10) Patent No.: US 7,421,261 B2
(45) Date of Patent: Sep. 2, 2008

(54) BLIND DETECTION

(75) Inventors: Henrik Sahlin, Mölnlycke (SE); Johan Axnäs, Solna (SE); Andreas Hedberg, Hägersten (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 558 days.

(21) Appl. No.: 10/479,102

(22) PCT Filed: Apr. 24, 2002

(86) PCT No.: PCT/SE02/00803

§ 371 (c)(1),
(2), (4) Date: Nov. 24, 2003

(87) PCT Pub. No.: WO02/102008

PCT Pub. Date: Dec. 19, 2002

(65) Prior Publication Data

US 2004/0156448 A1    Aug. 12, 2004

(30) Foreign Application Priority Data

Jun. 12, 2001 (SE) .................................. 0102077

(51) Int. Cl.
*H04B 17/02* (2006.01)
(52) U.S. Cl. .................. 455/135; 455/132; 455/133; 455/134; 455/136; 455/67.11; 455/67.13; 455/63.1; 455/226.1; 455/226.3; 455/296; 375/147; 375/150; 375/152; 375/349; 375/350
(58) Field of Classification Search ............... 455/63.1, 455/65, 67.11, 13, 67.16, 132–136, 222, 455/224, 226.1–226.3, 67.13, 295–296; 375/260–262, 375/340–350, 147–152
See application file for complete search history.

(56) References Cited

U.S. PATENT DOCUMENTS

| 5,278,870 | A  | * | 1/1994  | Mays et al. ................. 375/346 |
| 5,889,823 | A  | * | 3/1999  | Agazzi et al. ............... 375/341 |
| 6,091,361 | A  | * | 7/2000  | Davis et al. ................ 342/378 |
| 6,470,192 | B1 | * | 10/2002 | Karlsson et al. ............. 455/561 |
| 6,763,074 | B1 | * | 7/2004  | Yang .......................... 375/328 |

FOREIGN PATENT DOCUMENTS

| WO | WO-99/39484 |   | 8/1999 |
| WO | WO 99/39484 | * | 8/1999 |

OTHER PUBLICATIONS

"EGPRS One Phase Access, Short Access, Two Phase Access and Uplink Modulation Capability", ETSI Tdoc SMG2 EDGE 2E99-279, ETSI SMG2 Working Session on EDGE, Montigny Le Bretonneux, France, Aug. 24-27, 1999, (pp. 1-9).

(Continued)

*Primary Examiner*—Tuan A Tran
(74) *Attorney, Agent, or Firm*—Roger S. Burleigh

(57) ABSTRACT

The present invention relates to a blind detection of a received signal having at least one property, which initially is unknown to the receiver, however, limited to a finite set of alternatives ($\{p_1, p_2, \ldots, p_m\}$). According to the invention, the unknown property is automatically identified as follows. A respective quality measure ($q_1, q_2, \ldots, q_m$) is derived from the incoming signal ($r(n)$), which each represents a particular property in the finite set of alternatives ($\{p_1, p_2, \ldots, p_m\}$). The quality measures ($q_1, q_2, \ldots, q_m$) are obtained according to a procedure that involves a computationally efficient rejection of any unwanted signal components in the incoming signal ($r(n)$). Then, the quality measures ($q_1, q_2, \ldots, q_m$) are compared with each other in order to find a quality measure, which best fulfills a blind selection criterion. The quality measure ($q_i$) thus obtained corresponds to the initially unknown property ($p_i$). For instance, based on this information, the incoming signal ($r(n)$) may then be further processed in a processing unit (122), which operates according to a processing principle ($C_{di}$) that is adapted to this property ($p_i$).

27 Claims, 1 Drawing Sheet

OTHER PUBLICATIONS

Mario Marques Da Silva, "Parallel Interference Cancellation with Commutation Signaling", IEEE International Conference on Communications, vol. 3, Jun. 2000, (pp. 1213-1217).

Carlos Anton-Haro et al., "Array Joint Detection for C/TDMA Systems in UMTS Environments", IEEE 5th International Symposium on Spread Spectrum Techniques and Applications, vol. 2, Sep. 1998, (pp. 394-398).

David Asztely et al., "MLSE and Spatio-Temporal Interference Rejection Combining with Antenna Arrays", Proceedings of the EUSIPCO98, Sep. 1998, (4 pgs.).

* cited by examiner

BLIND DETECTION

THE BACKGROUND OF THE INVENTION AND PRIOR ART

The present invention relates generally to blind detection of received signals having at least one property, which initially is unknown to the receiver. More particularly the invention relates to a method of identifying a property from a finite set of alternatives of an incoming signal according to the preamble of claim 1 and a blind signal detector according to the preamble of claim 21. The invention also relates to a computer program according to claim 19 and a computer readable medium according to claim 20.

Many communication standards provide examples of situations where a receiver must be able to receive a certain signal whose format, at least to some extent, is unknown. The receiver thus needs to perform a blind detection of the signal, i.e. no signaling takes place between the transmitter and the receiver before transmission according to the unknown format is initiated.

The GSM/EDGE-standard (GSM=Global System for Mobile communication; EDGE=Enhanced Data rates for Global Evolution) utilizes two different modulation schemes, namely GMSK (Gaussian Minimum Shift Keying) and 8PSK (Phase Shift Keying with eight different phase states). At start of transmission the transmitter may use any of these modulation schemes. Furthermore, during transmission, the modulation schemes can be changed, without notice, between every radio block (i.e. between every set of four consecutive bursts). This transmitter behavior, of course, requires a blind-detection capability of the receiver, at least with respect to said modulation schemes.

A theoretically conceivable solution would be to detect any received burst in parallel, both by means of a GMSK-equalizer and by means of an 8PSK-equalizer. This would result in two estimated sequences of bits that correspond to the received signal. A checksum/parity test could then be used to determine which modulation scheme that was actually applied when transmitting the sequence. The sequence detected under the incorrect modulation format would namely not pass such test. Naturally, the payload information contained in the received burst can also be derived through this solution simply by studying the sequence corresponding to the correct modulation format. However, the solution is far too computationally complex to be implemented in real time applications and is therefore not interesting from a technical point-of-view. There is yet no alternative solution either, which is satisfying in this respect.

The standard document ETSI Tdoc SMG2 EDGE 2E99-279, ETSI SMG2 Working Session on EDGE, Montigny Le Bretonneux, France, 24-27 Aug., 1999 presents a method for automatic detection of another unknown property of a received signal, namely a training sequence, and how to select an appropriate detection principle for the received signal. The document proposes that one out of three possible training sequences be identified according to the following procedure. First, a signal in the form of a radio burst is received. This signal is tested against a respective hypothesis for each of the three possible training sequences. The training sequence that corresponds to the hypothesis that results in the highest estimated signal power of the received burst is then selected as the training sequence having been used for the burst in question. Under ideal conditions, this procedure generally generates selection decisions of a sufficient accuracy. However, an actual radio environment is usually far from ideal. The received signal is hence more or less distorted by additive noise and/or interference signals. The interference signals typically originate from other radio stations, either transmitting at the same frequency/channel (so-called co-channel interference) or transmitting at an adjacent frequency/channel (so-called adjacent channel interference).

The demodulation schemes of today's radio communication systems normally include interference rejection algorithms in order to mitigate the effects of any undesired signal components in the received signal, such as noise and interference signals. In case a receiver in a system of this kind is required to make decisions pertaining to an unknown property of a received signal, and if these decisions per se do not involve interference rejection, there is a risk that the interference rejection algorithms with respect to the detected signal become useless, namely if, due to interference, an incorrect blind detection decision is taken. Hence, if a corresponding interference rejection is not also included in the blind detection procedure, this procedure is prone to be the limiting factor for the receiver performance, and consequently the entire system's performance. Presently, there exists no blind detection procedure, which involves interference rejection. Moreover, a direct inclusion of any of the known interference rejection algorithms into the known blind detection procedures would, again, impose a computation demand on the receiver, which is too high to be performed in real time.

SUMMARY OF THE INVENTION

The object of the present invention is therefore to provide a blind detection solution, which alleviates the problems above and thus both produces reliable blind detection decisions and is possible to carry out in real time.

According to one aspect of the invention the object is achieved by a method of identifying, from a finite set of alternatives (hypotheses), a property of an incoming signal as initially described, which is characterized by deriving quality measures in consideration of interference rejection with respect to unwanted signal components in the incoming signal.

According to a preferred embodiment of the proposed method the incoming signal is received in one reception branch and the interference rejection is accomplished by means of calculating the quality measures in consideration of a temporal whitening of the incoming signal.

According to another preferred embodiment of the proposed method separate versions of the incoming signal are received via at least two different reception branches and the interference rejection is accomplished by means of calculating the quality measures in consideration of a spatio decorrelation of the separate versions of the incoming signal.

According to yet another preferred embodiment of the proposed method separate versions of the incoming signal are received via at least two different reception branches and the interference rejection is accomplished by means of calculating the quality measures in a combined consideration of a spatio decorrelation of the separate versions of the incoming signal and a temporal whitening of the incoming signal. Thus, a so-called spatio-temporal interference rejection is performed.

According to a further aspect of the invention the object is achieved by a computer program directly loadable into the internal memory of a computer, comprising software for performing the above proposed method when said program is run on a computer.

According to another aspect of the invention the object is achieved by a computer readable medium, having a program recorded thereon, where the program is to make a computer perform the proposed method.

According to still another aspect of the invention the object is achieved by a blind signal detector as initially described, which is characterized in that each quality measure generator includes an interference suppressor, which suppresses the effects of unwanted signal components in the incoming signal.

The invention might place a computation demand on the receiver, which is moderately higher than according to some of the previously known solutions for blind detection without interference rejection. In return, the invention offers a solution that is clearly superior to any of the known blind detection methods in non-ideal signal environments. Naturally, this provides a competitive edge in most communication systems. Furthermore, the invention may be applied in a wide variety of communication systems, irrespective of which type of signal format and transmission medium that is employed.

BRIEF DESCRIPTION OF THE DRAWINGS

The present invention is now to be explained more closely by means of preferred embodiments, which are disclosed as examples, and with reference to the attached drawings.

Figure 1:
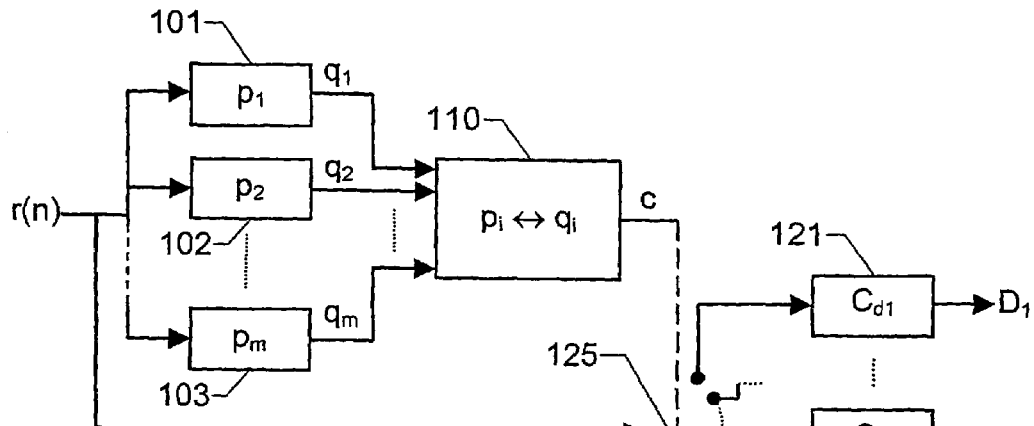
FIG. 1 shows a block diagram over a blind signal detector according to the invention.

DESCRIPTION OF PREFERRED
EMBODIMENTS OF THE INVENTION

The principle for blind detection according to the invention is applicable in communication systems using many transmission media other than radio. However, free space environments, where the signals typically are transmitted by means of radio waves, generally impose more complex signal conditions than the alternative environments, where the signals are more constrained by, for instance, being conducted via electrical cables or optical fibers. Therefore, a system model including a time dispersive radio channel is introduced here in order to present a general framework for the invention.

A vector of M received signals, which are symbol space sampled, can be modeled as:

$$r(n) = \begin{bmatrix} r_1(n) \\ r_2(n) \\ \vdots \\ r_M(n) \end{bmatrix}$$

$$= \sum_{m=0}^{L} \begin{bmatrix} h_1(m) \\ h_2(m) \\ \vdots \\ h_M(m) \end{bmatrix} s(n-m) + \begin{bmatrix} v_1(n) \\ v_2(n) \\ \vdots \\ v_M(n) \end{bmatrix}$$

$$= \sum_{m=0}^{L} h(m)s(n-m) + v(n)$$

where $h(m)$ is a vector with a set of coefficients for a tap m in a channel having L+1 taps, $s(n)$ represents the symbols that have been sent, and $v(n)$ denotes additive noise, i.e. an unwanted signal component. The above model is defined for a multi-branch system. Nevertheless, it is applicable also to a single-branch system simply by setting M=1.

The additive noise $v(n)$ can in turn be modeled by means of an auto regressive model:

$$v(n) = \sum_{k=1}^{K} A(k)v(n-k) + e(n)$$

where $A_k$ is a matrix of auto regressive (AR) coefficients and $e(n)$ is a noise vector, which is assumed to be temporally white and Gaussian with a zero mean and covariance matrix Q:

$$E\{e(n)e(n)^H\} = Q$$

where $^H$ denotes a transpose and complex conjugate (Hermite).

The covariance matrix of the noise Q has a size of M×M elements and can, in turn, be expressed as:

$$Q = C_{rr} - C_{rs}C_{ss}^{-1}C_{rs}^H$$

where $$C_{rr} = \sum_{n=L}^{N_{tr}} r(n_0 + n)r^H(n_0 + n)$$

$$C_{rs} = \sum_{n=L}^{N_{tr}} r(n_0 + n)S^H(n_0 + n)$$

$$C_{ss} = \sum_{n=L}^{N_{tr}} S(n)S^H(n)$$

and $S(n) = [s(n)\ s(n-1)\ \ldots\ s(n-L)]^T$

In the above expressions, $n_0$ denotes a synchronization position and $s(n)$ represents a sequence of $N_{tr}+1$ training symbols. It should be noted that the matrices above $C_{rr}$ and $C_{ss}$ are referred to as covariance matrices, even though they are not normalized with respect to the number of samples. The covariance matrix of the desired signal C is expressed as:

$$C = C_{rs}C_{ss}^{-1}C_{rs}^H$$

i.e. the last term in the expression for the covariance matrix of the noise Q.

In the single reception branch case (i.e. M=1), the synchronization position $n_0$ is selected such that the residual noise variance $\sigma^2 = Q$ is minimal. When instead, separate versions of the incoming signal are available via multiple reception branches (i.e. M>1), either trace synchronization min{Trace{Q}} or determinant based synchronization min{|Q|} can be used for localizing the synchronization position $n_0$.

A least square channel estimate follows from the expression:

$$[\hat{h}(0)\hat{h}(1)\ldots\hat{h}(L)] = C_{rs}C_{ss}^{-1}$$

and the residual noise can be calculated as:

$$e(n) = r(n_0 + n) - \sum_{m=0}^{L} \hat{h}(m)s(n-m) \qquad L \leq n \leq N_{tr}.$$

A temporal whitening of the noise in the incoming signals can be accomplished according to a FIR (Finite Impulse Response) filtering:

$$r_w(n) = \sum_{k=0}^{K} W(k)r(n-k)$$

where the W(k) matrices represent the FIR coefficients, which are given by:

$$W(k) = \begin{cases} -\hat{A}(k), & \text{for } k > 0 \\ I, & \text{for } k = 0 \end{cases}$$

in which I is the identity matrix and the $\hat{A}_k$ elements are estimated with, for instance, an indirect GLS (Generalized Least Square) multi-branch algorithm or a single-branch LDA (Levinson Durbin Algorithm).

A whitening filter of FIR type can be constructed by estimating an auto regressive model of the noise, see the matrices W(k) above. This whitening filter reduces the impact from any interference in the equalizer, which in turn improves the equalizer's performance significantly. Especially the adjacent channel interference can thereby be reduced. For instance, the estimation of the auto regressive model can be performed by an LDA.

A spatio noise decorrelation can be preformed according to the expression:

$$r_{wD}(n) = Dr_w(n)$$

where D is a matrix with the following property: $\hat{Q}^{-1} = D^H D$ with $\hat{Q}$ being an estimate of the noise covariance matrix Q. The matrix D can be calculated by using a Cholesky factorization scheme. It should be pointed out that the whitening and the spatio noise decorrelation can be performed in the same step by multiplying the matrix D with the matrices W(k) before carrying out the above FIR filtering. Further details as how to accomplish a combined spatio decorrelation and temporal interference rejection can be found in the article "MLSE and Spatio-Temporal Interference Rejection Combining with Antenna Arrays", Proceedings European Signal Processing Conference, pp 1341-1344, September 1998 by D. Asztély et al.

As mentioned earlier, blind detection is necessary in communication systems in which the transmitter may alter between two or more modulation formats without prior announcement. The GSM/EDGE-standard constitutes one such example, where either a GMSK or a 8PSK modulation scheme is used. A so-called derotation $r_{GMSK}(n)$ of a received signal r(n), after which a quality measure that takes interference suppression into account may be calculated, can for the GMSK hypothesis be expressed as:

$$r_{GMSK}(n) = e^{-j2^{\pi}n}r(n).$$

A corresponding derotation $r_{8PSK}(n)$ for the 8PSK hypothesis can be expressed as:

$$r_{8PSK}(n) = e^{-j8^{3\pi}n}r(n).$$

After derotation, the quality measures $q_{GMSK}(n)$ and $q_{8PSK}(n)$ can be derived according to the same principle for both the GMSK hypothesis and the 8PSK hypothesis.

The incoming signal may either be a scalar (i.e. received in a single branch) or be multi-dimensional (i.e. received via two or more branches).

An identifying procedure for finding a most probable modulation scheme involves comparing the quality measures $q_{GMSK}(n)$ and $q_{8PSK}(n)$ with each other in order to determine which quality measure that best fulfills a blind selection criterion. For example, if the quality measures $q_{GMSK}(n)$; $q_{8PSK}(n)$ represent a respective signal-to-noise ratio (SNR) after whitening, the test would simply be to find the largest quality measure value (i.e. best SNR). A corresponding modulation scheme would then be regarded as the most probable for the incoming signal. Based on this information, a processing unit (e.g. an equalizer) that operates according to a matching demodulation scheme may then be selected for further processing the incoming signal.

Either the same equalizer could be used in both the GMSK- and the 8PSK-case, however with different parameter settings, or different equalizer structures could be used for the different demodulation schemes, i.e. one equalizer designed for GMSK and another designed for 8PSK.

Another example of a situation in which blind detection is necessary, is when different training sequences are employed by the transmitter without prior indication to the receiver. In certain radio communication systems the training sequence is namely not only used for estimating radio channel properties in the receiver, the type of training sequence per se also carries information. For example, a GSM/EDGE system, uses the access burst to transport data in the random access channel (RACH) and the packet random access channel (PRACH). Three different training sequences, TS0, TS1 and TS2, are used by a mobile station to indicate its uplink capability. A base station receiving an uplink signal from the mobile station thus cannot know in advance which of the three possible training sequences that will be sent. Therefore, the receiver in the base station must perform a blind detection in respect of the training sequence. The quality measures to be compared are here denoted $q_{TS0}$, $q_{TS1}$ and $q_{TS2}$, one for each training sequence TS0, TS1 and TS2 respectively. Depending on the quality measure $q_{TS0}$, $q_{TS1}$ or $q_{TS2}$ for the incoming signal that best satisfies a blind selection criterion, a decision is subsequently made whether the training sequence was TS0, TS1 or TS2.

It should be noted that a particular quality measure in turn may be constituted by any linear or non-linear combination of sub-values. According to the invention, the quality measures nevertheless always take interference suppression into account. Furthermore, the proposed method is applicable to any symbol sequence, i.e. not exclusively to a distinction between different training sequences.

FIG. 1 shows a block diagram over a general blind signal detector according to the invention, which may be used for blind detection of the above mentioned modulation formats, the training sequences as well as any other unknown property of an incoming signal, provided there is a finite number of alternatives for the unknown property. Particularly, the modulation formats may include any M-ary phase shift keying scheme with M≠8, such as 2PSK, 4PSK or 16PSK (i.e. for M equal 2, 4 and 16 respectively).

An incoming signal r(n) is fed in parallel to at least two different quality measure generators 101, 102 and 103. The FIG. 1 shows three quality measure generators, however any number larger than one is equally well conceivable. In any case, each quality measure generator 101-103 is adapted to produce a quality measure $q_1, q_2, \ldots, q_m$ in respect of one out of the possible alternatives for the unknown property $p_1, p_2, \ldots, p_m$. Nevertheless, in practice, two or more quality measure generators may be represented by the same physical unit, the operation of the generator then being determined by different settings of at least one variable parameter. Consequently, if time allows, all the quality measures $q_1$-$q_m$ can, in fact, be produced in series by one and the same quality measure generator. Furthermore, results obtained in a first quality measure generator, e.g. 101, may be re-used in second quality measure generator, e.g. 102 or 103, in order to reduce the number of calculations. Each quality measure generator 101-103 also includes an interference suppressor, which suppresses unwanted signal components in the incoming signal r(n). Hence, the interference suppressor performs an interference rejection for the incoming signal r(n) received in one reception branch in consideration of a temporal whitening, or for separate versions of the incoming signal r(n) received via two or more reception branches, either in consideration of a spatio decorrelation of the separate versions or in combined consideration of temporal whitening and spatio decorrelation.

According to one embodiment of the invention, the quality measures $q_1$-$q_m$ are determined on basis of a power level of the incoming signal r(n) after interference rejection with respect to a particular detection hypothesis and a noise power level after interference rejection. As an example, the power levels may be used to express an SNR, which will be expounded below.

For reception of the incoming signal in a single branch, the following quality measure may be used:

$$q_X = \frac{c_X}{\tilde{\sigma}_X^2}$$

where $\sigma_X^2$ denotes the variance of the residual noise after whitening, $c_X$ denotes the variance of the desired signal and the subscript X refers to a particular property hypothesis (or quality measure) for the incoming signal r(n). Thus, the blind detection involves whitening both with respect to the desired signal and the residual noise.

According to an alternative embodiment of the invention, the residual noise after whitening instead forms a basis for the blind detection by means of the following quality measure:

$$q_X = -\sigma_X^2$$

where a minimum value of $\sigma_X^2$ corresponds to a maximum value of the SNR.

The variance of the residual noise $\sigma^2$ is obtained immediately from the LDA, provided that an AR(2)-model is used. Thus, neither all the AR coefficients need to be calculated nor is it necessary to explicitly filter the residual noise. In fact, it is sufficient to merely calculate the quality measure in consideration of a temporal whitening of the incoming signal as follows:

$$\sigma^2 = cov(0)$$

$$a = -cov(1)/\sigma^2$$

$$\sigma^2(1-|a|^2)\sigma^2$$

$$a = -cov(2) + a \cdot cov(1)/\sigma^2$$

$$\sigma^2 = (1-|a|^2)\sigma^2$$

The covariance function cov(m) of the residual noise e(n) can, for instance, be estimated as:

$$cov(m) = \sum_{n=L}^{N_{tr}-m} e*(n+m)e(n)$$

$$\text{where } e(n) = r(n_0 + n) - \sum_{m=0}^{L} \hat{h}(m)s(n-m), \; L \leq n \leq N_{tr}.$$

In order to avoid several divisions in the expressions above, and thereby render the calculations more efficient, the variance of the residual noise $\sigma^2$ can instead be expressed as:

$$\tilde{\sigma}^2 = \frac{((cov(0))^2 - |cov(1)|^2)^2 - |cov(0)cov(2) - (cov(1))^2|^2}{cov(0)((cov(0))^2 - |cov(1)|^2)}.$$

According to one embodiment of the invention, when the incoming signal is received via multiple branches, the noise in the different branches can be spatio decorrelated by means of $r_{wD}(n) = Dr_w(n)$ and $\hat{Q}^{-1} = D^H D$, as mentioned earlier. This is applied when searching for the quality measure $q_i$ that best fulfills the selection criterion. The procedure thus involves selecting a synchronization position for a sequence of symbols in the incoming signal r(n). In order to avoid a factorization, which is relatively complex from a computational point-of-view, the following quality measure is proposed:

$$q_X = \text{Trace}\{C_{rrX} \hat{Q}_X^{-1}\}$$

where $C_{rrX}$ is the covariance matrix of the incoming signal r(n) after temporal whitening and $Q_X$ is a covariance matrix of the residual noise after temporal whitening. The subscript X designates the applicable property hypothesis (or quality measure).

According to an alternative embodiment of the invention, where only spatio decorrelation is performed, the quality measure may be simplified to:

$$q_X = \text{Trace}\{C_{rr} Q_X^{-1}\}$$

where $C_{rr}$ is the covariance matrix of the incoming signal r(n). The covariance matrix $Q_X$ is calculated according to $$Q_X = C_{rr} - C_{rs} C_{ss}^{-1} C_{rs}^H$$

as described earlier.

After the spatio decorrelation, the SNR may be expressed as:

$$SNR = \frac{\text{Trace}\{C_D\}}{\text{Trace}\{Q_D\}}$$

where $C_D$ is the covariance matrix of the desired signal after spatio decorrelation and $Q_D$ denotes the covariance matrix of the noise after decorrelation. Hence, the SNR can be written:

$$SNR = \frac{\text{Trace}\{DCD^H\}}{\text{Trace}\{DQD^H\}} = \frac{\text{Trace}\{CD^H D\}}{\text{Trace}\{QD^H D\}} = \frac{\text{Trace}\{(C_{rr} - Q)Q^{-1}\}}{\text{Trace}\{QQ^{-1}\}}$$

$$SNR = \frac{1}{M}\text{Trace}\{C_{rr}Q^{-1}\} - 1$$

In analogy with $q_X = -\sigma_X^2$ above, the quality measure $q_X = -|Q_X|$ can be used as an alternative.

According to one embodiment of the invention, where an incoming signal is received via multiple branches, an SNR-based quality measure $$q_X = \frac{c_X}{\sigma_X^2}$$

can be calculated for each different branch individually. These measures $q_X$ may then be added to form a combined quality measure, which exclusively takes temporal whitening into account.

In any case, a quality measure comparator 110 receives the quality measures $q_1$-$q_m$ and compares them with each other in order to determine which quality measure $q_i$ that best fulfills a relevant blind selection criterion. Based on the result of this investigation the quality measure comparator 110 identifies a particular property $p_i$, which corresponds to the best quality measure $q_i$. According to one embodiment of the invention, the quality measure comparator 110 also selects a particular processing unit 121, 122, . . . , 123 for further possible processing of the incoming signal r(n).

If further processing is to take place, the quality measure comparator 110 selects the processing unit 122, which corresponds to a quality measure $q_i$ that best fulfills the blind selection criterion via a control signal c and a multiple switch 125. This processing unit 122 is namely expected to be capable of handling the incoming signal r(n) optimally by means of applying an appropriate processing principle $C_{di}$, such that a desired resulting signal $D_i$ is obtained. In radio applications, the processing units 121-123 are typically constituted by equalizers. However, technically, they can be represented by any alternative unit capable of realizing a processing principle, which is adapted to the particular incoming signal r(n).

Moreover, according to one embodiment of the invention, when decoding the incoming signal r(n), the selected processing unit 122 also re-uses data having been obtained as a result from the processing in the corresponding quality measure generator.

Figure 2:
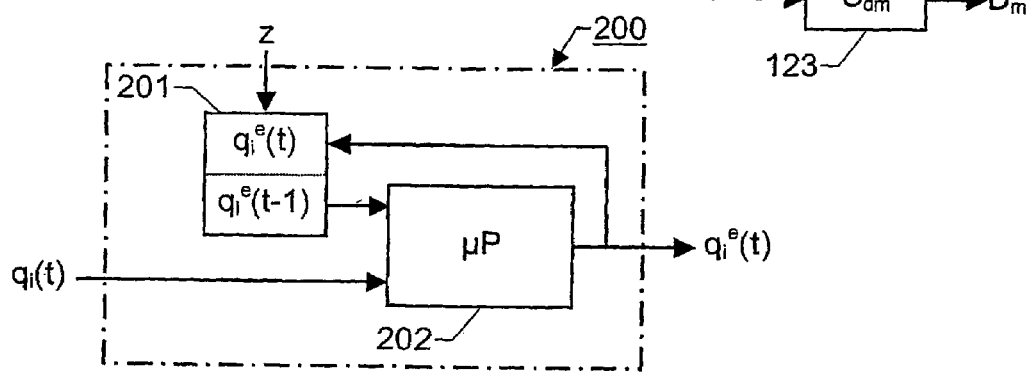
FIG. 2 shows a block diagram over a recursive unit, which is included in a quality measure comparator according to one embodiment of the invention.

FIG. 2 shows a block diagram over a recursive unit 200, which is included in the quality measure comparator 110 according to one embodiment of the invention. A processor 202 in the recursive unit 200 receives a preliminary quality measure $q_i(t)$ for a current segment of the received signal r(n), where t denotes a time index corresponding to the number of segments previously received. The processor 202 then generates an enhanced quality measure $q_i^e(t)$ for the segment on basis of the preliminary quality measure $q_i(t)$ and a quality measure $q_i^e(t-1)$ for at least one previous segment of the incoming signal r(n), which is stored in a buffer 201. If the current segment is the first segment of the received signal r(n), the enhanced quality measure $q_i^e(t)$ will be identical with the preliminary quality measure $q_i(1)$. The thus generated enhanced quality measure $q_i^e(t)$ is then used as a basis for a current selection decision. The enhanced quality measure $q_i^e(t)$ is also fed to the buffer 201 for storage. An enhanced quality measure $q_i^e(2)$ for a following segment of the received signal r(n) is generated by the processor 202 on basis of a combination of the previous (enhanced) quality measure $q_i^e(1)$ and a preliminary quality measure $q_i(2)$ for this segment r(n), and so on.

According to a preferred alternative under this embodiment of the invention, the enhanced quality measure $q_i^e(t)$ represents an arithmetic average value between the at least one stored quality measure $q_i^e(t-1)$ and the preliminary quality measure $q_i(t)$. This averaging increases the reliability of the blind detection and is preferably carried out with respect to all bursts in a particular radio block. Optionally, the buffer 201 may be cleared between the separate radio blocks by means of a reset signal z.

For example, the recursive unit 200 may be utilized to improve the quality of selection decisions in GSM/EDGE between the modulation schemes GMSK and 8PSK. In GSM/EDGE a radio block typically consists of four individual bursts. The modulation (GMSK or 8PSK) is one and the same for all bursts of such a block. In order to take into account the quality measures of all bursts in a particular block when identifying the relevant modulation scheme, the arithmetic average of the respective quality measures for the bursts in the block can, for instance, together form a total quality measure. Unfortunately, in a real-time application, this is not always feasible. It is namely common that a further signal treatment (equalisation, decoding etc) of a first received burst of a block must commence before the later bursts have been received. The decision for the first burst must then rely solely on the quality measure of this burst. However, for the second burst, the quality measures of both the first and the second burst can be used. For the third burst, all of the preceding bursts may again be used, and so on. In other words, the buffer 201 must at least store quality measures from preceding bursts belonging to the same block. These quality measures may either be stored separately or as one or more accumulated variables.

It should also be noted that, in principle, any computational algorithm with the quality measures of the current and the preceding bursts may be used to reach the decision as to which modulation scheme is being applied. The arithmetic average value thus merely constitutes an example.

According to another preferred alternative under this embodiment of the invention, a blind detection decision from any intermediate burst is utilized for equalizing the remaining bursts, for instance, in a particular radio block. This procedure is advantageous when no or only very few errors can be tolerated in the detected sequence.

Figure 3:
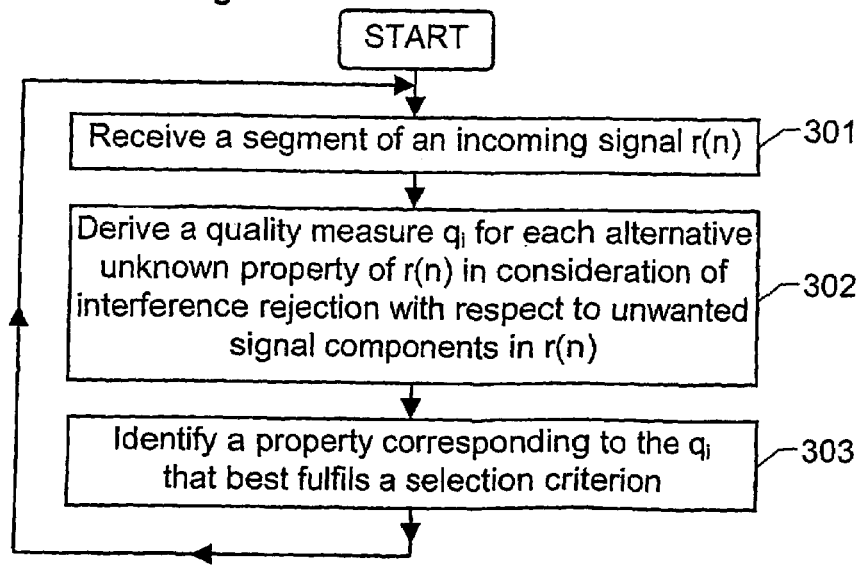
FIG. 3 illustrates, by means of a flow diagram, a general method according to the invention.

In order to sum up, a general method of performing blind detection according to the invention will now be described with reference to a flow diagram in FIG. 3.

A first step 301 receives a segment of an incoming signal, which is presumed to have a property that is unknown with respect to one out of a finite set of alternatives. Subsequently, a step 302 derives a quality measure for the incoming signal in respect of each of the alternatives. The calculation of the quality measures is carried out in consideration of an interference rejection with respect to any unwanted signal components in the incoming signal. A following step 303 identifies a property that represents a best quality measure with respect to a selection criterion. After that, the procedure loops back to the step 301 again.

The identification in the step 303 may, for instance, involve a sub-step in which the quality measures are ranked from a best score down to a worst score. A following sub-step then selects the property being associated with the topmost quality measure.

Naturally, all of the process steps, as well as any subsequence of steps, described with reference to the FIG. 3 above may be carried out by means of a computer program being directly loadable into the internal memory of a computer, which includes appropriate software for performing the necessary steps when the program is run on a computer. The computer program can likewise be recorded onto arbitrary kind of computer readable medium.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method of identifying, from a finite set of alternatives ($\{p_1, p_2, \ldots, p_m\}$), a property of a particular incoming signal ($r(n)$), comprising the steps of:
   deriving from the incoming signal ($r(n)$), for each of the alternatives, a respective quality measure ($q_1, q_2, \ldots, q_m$) representing a particular property of the incoming signal ($r(n)$);
   identifying a property ($p_i$) of the incoming signal ($r(n)$), which corresponds to a quality measure ($q_i$) that best fulfills a blind selection criterion; and,
   deriving the quality measures ($q_1, q_2, \ldots, q_m$) in consideration of interference rejection with respect to unwanted signal components in the incoming signal ($r(n)$);
   wherein m is a positive integer and i ranges from 1 to m.

2. The method according to claim 1, further comprising the steps of:
   receiving the incoming signal ($r(n)$) in one reception branch; and,
   calculating the quality measures ($q_1, q_2, \ldots, q_m$) in consideration of a temporal whitening of the incoming signal ($r(n)$).

3. The method according to claim 2, further comprising the step of calculating the quality measures ($q_1, q_2, \ldots, q_m$) on the basis of a fictitious temporally whitened version of the incoming signal ($r(n)$).

4. The method according to claim 2, wherein the quality measure ($q_1, q_2, \ldots, q_m$) is inversely proportional to the variance of a residual noise component in a signal resulting from the temporal whitening.

5. The method according to claim 1, further comprising the steps of:
   receiving separate versions of the incoming signal ($r(n)$) via at least two different reception branches; and,
   calculating the quality measures ($q_1, q_2, \ldots, q_m$) in consideration of a spatio decorrelation of the separate versions of the incoming signal ($r(n)$).

6. The method according to claim 5, further comprising the step of calculating the quality measures ($q_1, q_2, \ldots, q_m$) in a combined consideration of the temporal whitening of the incoming signal ($r(n)$) and the spatio decorrelation of the separate versions of the incoming signal ($r(n)$) received via the at least two different reception branches.

7. The method according to claim 1, further comprising the step of calculating the quality measures ($q_1, q_2, \ldots, q_m$) on the basis of a fictitious spatially decorrelated version of the incoming signal ($r(n)$).

8. The method according to claim 7, wherein the step of calculating the quality measures ($q_1, q_2, \ldots, q_m$) comprises the step of selecting a synchronization position for a sequence of symbols in the incoming signal ($r(n)$) by means of trace synchronization.

9. The method according to claim 7, wherein the step of calculating the quality measures ($q_1, q_2, \ldots, q_m$) comprises the step of selecting a synchronization position for a sequence of symbols in the incoming signal ($r(n)$) by means of determinant synchronization.

10. The method according to claim 1, further comprising the steps of:
    storing at least one quality measure ($q_i^e(t-1)$) for at least one previous segment of the incoming signal ($r(n)$); and,
    generating an enhanced quality measure ($q^e(t)$) for a current segment of the received signal ($r(n)$) on the basis of the at least one stored quality measure ($q_i^e(t-1)$) and a preliminary quality measure ($q_i(t)$) for the current segment of the incoming signal ($r(n)$).

11. The method according to claim 10, wherein the enhanced quality measure ($q_i^e(t)$) represents an arithmetic average value between the at least one stored quality measure ($q_i^e(t-1)$) and the preliminary quality measure ($q_i(t)$).

12. The method according to claim 1, wherein the finite set of alternatives ($\{p_1, p_2, \ldots, p_m\}$) includes at least two different demodulation schemes.

13. The method according to claim 12, wherein the finite set of alternatives ($\{p_1, p_2, \ldots, p_m\}$) includes at least one of a Gaussian Minimum Shift Keying scheme and an M-ary Phase Shift Keying scheme.

14. The method according to claim 1, wherein the finite set of alternatives ($\{p_1, p_2, \ldots, p_m\}$) includes at least two different symbol sequences.

15. The method according to claim 14, wherein each of the symbol sequences represents a particular training sequence.

16. The method according to claim 1, wherein each quality measure ($q_1, q_2, \ldots, q_m$) is determined on the basis of a power level of the incoming signal ($r(n)$) after interference rejection and a noise power level after interference rejection.

17. The method according to claim 1, wherein each quality measure ($\{q_1, q_2, \ldots, q_m\}$) is represented by a signal-to-noise ratio.

18. The method according to claim 1, wherein the incoming signal ($r(n)$) is a radio signal.

19. A computer readable medium storing codes (or instruction) in such a manner as to be readable and executable by a computer for performing the steps of claim 1.

20. A computer readable medium having a program recorded therein in such as manner to be readable and executable by a computer for performing the steps of claim 1.

21. The blind signal detector for receiving an incoming signal ($r(n)$) and automatically identifying a property of a particular incoming signal ($r(n)$) from a finite set of alternatives ($\{p_1, p_2, \ldots, p_m\}$), comprising:
    at least two quality measure generators (101-103), each receiving the incoming signal ($r(n)$), and in response thereto, producing a respective quality measure ($q_1, q_2, \ldots, q_m$) representing a particular property in the finite set of alternatives ($\{p_1, p_2, \ldots, P_m\}$);
    a quality measure comparator (110) for receiving the quality measures ($\{q_1, q_2, \ldots, q_m\}$), comparing the quality measures ($q_1, q_2, \ldots, q_m$) with each other, and identifying a property ($p_i$) of the incoming signal ($r(n)$) which corresponds to the quality measure ($q_i$) that best fulfills a blind selection criterion; and,
    wherein each quality measure generator (101-103) includes an interference suppressor which suppresses the effects of unwanted signal components in the incoming signal ($r(n)$);

wherein m is a positive integer and i ranges from 1 to m.

22. The blind signal detector according to claim 21, wherein:
the incoming signal (r(n)) is fed to the at least two quality measure generators (101-103) via one reception branch; and,
the at east two quality measure generators (101-103) are adapted to calculate the quality measures ($q_1, q_2, \ldots, q_m$) in consideration of a temporal whitening of the incoming signal (r(n)).

23. The blind signal detector according to claim 21, wherein:
the incoming signal (r(n)) is fed to the at least two quality measure generators (101-103) via at least two different reception branches; and,
the at least two quality measure generators (101-103) are adapted to calculate the quality measures ($q_1, q_2, \ldots, q_m$) in consideration of a spatio decorrelation of the separate versions of the incoming signal (r(n)).

24. The blind signal detector according to claim 23, wherein the at least two quality measure generators (101-103) are adapted to calculate the quality measures ($q_1, q_2, \ldots, q_m$) in a combined consideration of the temporal whitening of the incoming signal (r(n)) and the spatio decorrelation of the separate versions of the incoming signal (r(n)) received via the at least two different reception branches.

25. The blind signal detector according to claim 21, wherein:
at least two of the at least two quality measure generators (101-103) are co-located in a single unit; and,
the operation of the respective quality measure generator (101-103) is determined by a value of at least one variable parameter.

26. The blind signal detector according to claim 21, wherein at least one first quality measure generator (101) delivers a calculation result to at least one second quality measure generator (102; 103).

27. The blind signal detector according to claim 21, wherein the quality measure comparator (110) includes a recursive unit (200) for storing at least one quality measure ($q_i^e(t-1)$) for at least one previous segment of the incoming signal (r(n)) and generating an enhanced quality measure ($q_i^e(t)$) for a current segment of the received signal (r(n)) on basis of the at least one stored quality measure ($q_i^e(t-1)$) and a preliminary quality measure ($q_i(t)$) for the current segment of the received signal (r(n)).

* * * * *

UNITED STATES PATENT AND TRADEMARK OFFICE
CERTIFICATE OF CORRECTION

PATENT NO. : 7,421,261 B2  Page 1 of 2
APPLICATION NO. : 10/479102
DATED : September 2, 2008
INVENTOR(S) : Sahlin et al.

It is certified that error appears in the above-identified patent and that said Letters Patent is hereby corrected as shown below:

In Column 5, Line 67, in Equation, delete " $=e^{-j2\pi n}r(n)$ " and insert -- $e^{-j\frac{\pi}{2}n}r(n)$ --, therefor.

In Column 6, Line 3, in Equation, delete " $=e^{-j8^{3\pi}n}r(n)$ " and insert -- $e^{-j\frac{3\pi}{8}n}r(n)$ --, therefor.

In Column 7, Line 43, delete " $\sigma_x^2$ " and insert -- $\tilde{\sigma}_x^2$ --, therefor.

In Column 7, Line 53, in Equation, delete " $\sigma_x^2$ " and insert -- $\tilde{\sigma}_x^2$ --, therefor.

In Column 7, Line 55, delete " $\sigma_x^2$ " and insert -- $\tilde{\sigma}_x^2$ --, therefor.

In Column 7, Line 57, delete " $\sigma^2$ " and insert -- $\tilde{\sigma}^2$ --, therefor.

In Column 7, Line 64, in Equation, delete " $\sigma^2 = cov(0)$ " and insert -- $\tilde{\sigma}^2 = cov(0)$ --, therefor.

In Column 7, Line 67, in Equation, delete " $a = -cov(1)/\sigma^2$ " and insert -- $a = -cov(1)/\tilde{\sigma}^2$ --, therefor.

In Column 8, Line 1, in Equation, delete " $\sigma^2(1-|a|^2)\sigma^2$ " and insert -- $\tilde{\sigma}^2 = (1-|a|^2)\tilde{\sigma}^2$ --, therefor.

In Column 8, Line 2, in Equation, delete " $a = -cov(2)+a \cdot cov(1)/\sigma^2$ " and insert -- $a = -cov(2)+a \cdot cov(1)/\tilde{\sigma}^2$ --, therefor.

In Column 8, Line 5, in Equation, delete " $\sigma^2 = (1-|a|^2)\sigma^2$ " and insert -- $\tilde{\sigma}^2 = (1-|a|^2)\tilde{\sigma}^2$ --, therefor.

In Column 8, Line 21, delete " $\sigma^2$ " and insert -- $\tilde{\sigma}^2$ --, therefor.

UNITED STATES PATENT AND TRADEMARK OFFICE
CERTIFICATE OF CORRECTION

PATENT NO. : 7,421,261 B2
APPLICATION NO. : 10/479102
DATED : September 2, 2008
INVENTOR(S) : Sahlin et al.

It is certified that error appears in the above-identified patent and that said Letters Patent is hereby corrected as shown below:

In Column 8, Line 39, in Equation, delete "$\{C_{rrX}\tilde{Q}_X^{-1}\}$" and insert -- $\{\tilde{C}_{nx}\tilde{Q}_x^{-1}\}$ --, therefor.

In Column 8, Line 40, delete "$C_{rrX}$" and insert -- $C_{rr}$ --, therefor..

In Column 9, Line 9, delete "$-\sigma_X^2$" and insert -- $-\tilde{\sigma}_x^2$ --, therefor.

In Column 12, Line 57, in Claim 21, delete "$P_m$" and insert -- $p_m$ --, therefor.

Signed and Sealed this

Seventh Day of April, 2009

JOHN DOLL
*Acting Director of the United States Patent and Trademark Office*